United States Patent
Brown et al.

(10) Patent No.: US 10,209,343 B1
(45) Date of Patent: Feb. 19, 2019

(54) WEAPON FIRE DETECTION AND LOCALIZATION SYSTEM FOR ELECTRO-OPTICAL SENSORS

(71) Applicant: The United States of America, as represented by the Secretary of the Army, Washington, DC (US)

(72) Inventors: Jeremy B. Brown, Alexandria, VA (US); John E. Hutchison, III, Alexandria, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 15/663,983

(22) Filed: Jul. 31, 2017

(51) Int. Cl.
*G01S 5/16* (2006.01)
*G01S 5/18* (2006.01)
*G01J 5/00* (2006.01)

(52) U.S. Cl.
CPC ............. *G01S 5/16* (2013.01); *G01J 5/0014* (2013.01); *G01S 5/18* (2013.01); *G01J 2005/0077* (2013.01)

(58) Field of Classification Search
CPC ................. G01S 5/16; G01S 5/18; G01J 5/16
See application file for complete search history.

(56) References Cited

U.S. PATENT DOCUMENTS

| | | | |
|---|---|---|---|
| 8,809,787 B2 | 8/2014 | Tidhar | |
| 8,995,227 B1 | 3/2015 | Johnson | |
| 9,196,041 B2 | 11/2015 | Moraites et al. | |
| 9,488,442 B2 | 11/2016 | Varga | |
| 2014/0086454 A1 | 3/2014 | Bauer et al. | |
| 2015/0242702 A1* | 8/2015 | Aphek | G06K 9/00771 382/113 |
| 2015/0304612 A1* | 10/2015 | Richards | H04N 5/33 348/159 |
| 2016/0112655 A1 | 4/2016 | Moraites et al. | |
| 2016/0133107 A1* | 5/2016 | Showen | G08B 17/08 340/540 |
| 2018/0047144 A1 | 2/2018 | Brown et al. | |

* cited by examiner

*Primary Examiner* — Hugh Maupin
(74) *Attorney, Agent, or Firm* — Richard J. Kim (57) ABSTRACT

An electro-optical imaging sensors system is disclosed for detecting and locating a blast, including muzzle flash, created by the launch of a projectile from a gun barrel, rocket tube or similar device, generally associated with weapons fire. The system is used in conjunction with detection algorithms and provides the azimuth and elevation from the detecting sensor to the location of the blast (the launch location) and also provides the weapon classification.

16 Claims, 9 Drawing Sheets

WEAPON FIRE DETECTION AND LOCALIZATION SYSTEM FOR ELECTRO-OPTICAL SENSORS

GOVERNMENT INTEREST

The invention described herein may be manufactured, used, sold, imported, and/or licensed by or for the Government of the United States of America.

FIELD OF THE INVENTION

This invention relates to the field of detection systems, and in particular, a system for detecting and locating a blast, including muzzle flash, created by the launch of a projectile from a gun barrel, rocket tube or similar device, generally associated with weapons fire.

BACKGROUND OF THE INVENTION

Weapon fire detection and localization can be accomplished using a variety of sensing modalities. Typical modalities include radar, acoustic, electro-optic, or some combination of these. Electro-optical solutions typically exploit projectile launch blast, thermal radiation of in-flight round, and the thermal radiation of rocket motors of missiles and rockets. Electro-optical solutions are often employed for close range small arms, and guided and unguided projectile detection. Additionally, air-systems have employed electro-optical sensors for long range weapons fire detection systems such as missile warning systems. For systems detecting weapons fired air-to-air or ground-to-air, atmospheric signal degradation is less impactful than for systems which detect ground-to-ground weapons fire. Long range electro-optical weapons fire detection systems for ground application must be able to handle complications due to atmospheric signal degradation and near field clutter sources.

Electro-optical weapons fire detection systems for ground application, capable of detecting short and long range threats require complex detection methodologies to accurately detect weapons fire over a broad dynamic range of signal intensity. When a high intensity weapon signature is available, as when the launch is near the sensor, simple thresholds can be used to detect weapon fire while minimizing clutter sources. Long range electro-optical weapons fire detections often involve severely reduced signature intensities due to atmospheric degradation. Additionally, near field motion can generate clutter sources of similar intensities to far field weapons fire. A complex detection system is required to differentiate actual weapons fire signatures of various intensities from cluttered backgrounds while providing acceptable detection rates.

SUMMARY OF THE INVENTION

A detection system that operates on the output of an imaging detection sensor system based on three electro-optical imagers is presented here. The detection method is able to extract weapons fire signatures of high signal intensity in the near field, as well as very low intensity weapons fire signatures in the far field, with a high detection rate. The detection method minimizes false detections from clutter sources. The detection method discriminates weapons fire signatures from background by analyzing characteristics of the extracted signature. Features of the extracted signature are used to classify the detection as either weapons fire or false alarm, where weapon fire can be subdivided into anti-tank guided missile (ATGM), recoilless rifle (RR), and rocket propelled grenade (RPG). Weapon fire is not limited to ATGM, RR, and RPG, but can include other sources such as small arms fire, and main gun fire from tanks and armored fighting vehicles, as the system is intended to detect a blast, including muzzle flash, created by the launch of a projectile from a gun barrel, rocket tube or similar device.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

The First Exemplary Weapon Fire Detection and Localization System.

Figure 1:
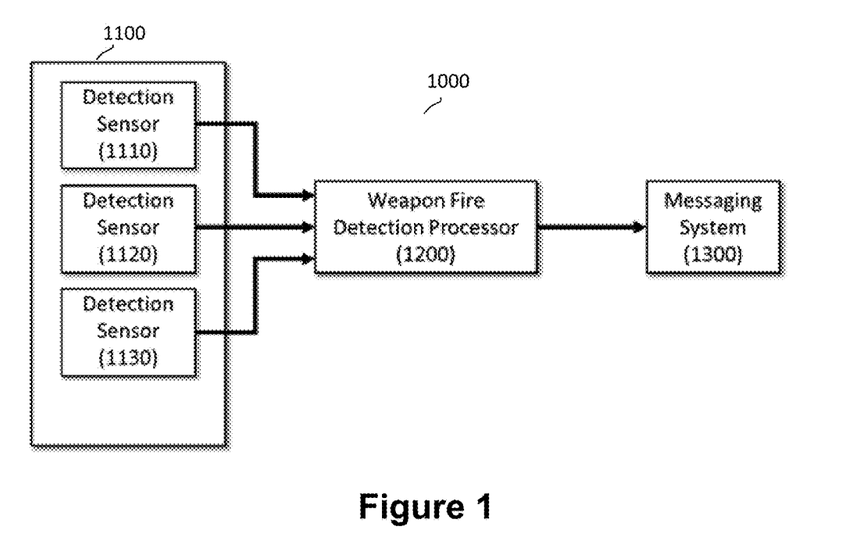
FIG. 1 describes a first exemplary weapon fire detection and localization system.

FIG. 1 describes the first exemplary weapon fire detection and localization system. The system (1000) is comprised of a weapon fire detection imaging sensor system (1100), a processor (1200), and a messaging system (1300). The weapon fire detection imaging sensor system is comprised of three imaging detection sensors (1110, 1120, 1130), each of which images in a different spectral range. The video output of the detection sensor is provided as an input to the processor. The processor hosts the weapon fire detection and localization algorithm. The messaging system distributes the output results of the weapon fire detection and localization algorithm to other connected systems, providing an alert message.

Figure 2A:
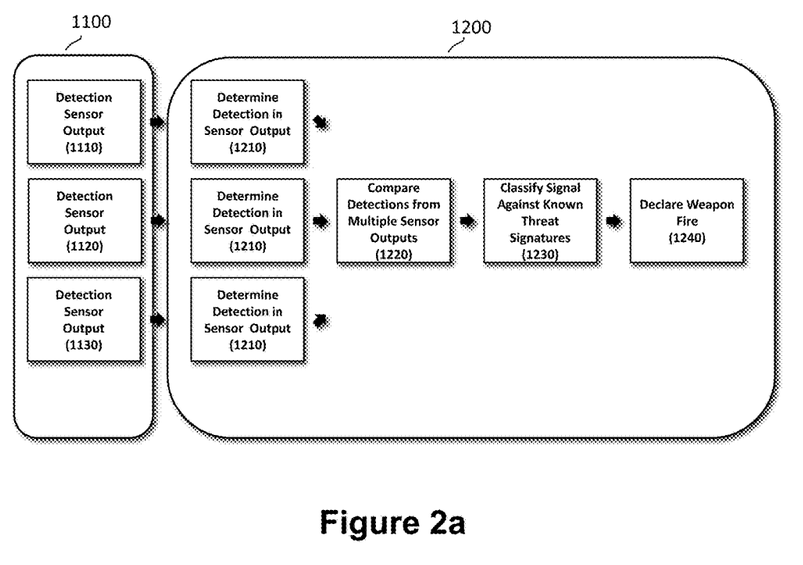
FIG. 2a describes a first exemplary weapon fire detection and localization algorithm as it relates to the first exemplary weapon fire detection and localization system.

FIG. 2a describes the first exemplary weapon fire detection and localization algorithm. For each imaging detection sensor (1110, 1120, 1130), the video output is provided to the processor. Weapon fire detections are determined from the independent video output of each imaging detection sensor in the weapon fire detection sensor system (1210). When using multiple imaging detection sensors, a single weapons fire event may generate detections on multiple sensors. The detections across multiple sensors are then analyzed to determine if they were generated by a single hostile fire event. If the multiple detections are found to have been generated by a single hostile fire event, a single detection is created (1220). Features are calculated from the temporal and intensity profiles of a detection and used to classify the detection as either weapons fire or false alarm, where weapon fire can be subdivided into ATGM, RR, and RPG. Associated detections, which have been classified as weapon fire are declared as weapon fire (1240). For each declared weapon fire event, the azimuth location, elevation location, weapon classification, and time of firing are reported.

Detailed Description of the Drawings (FIGS. 1 & 2a).

FIG. 1 describes the first exemplary weapon fire detection and localization system. The system (1000) is comprised of a weapon fire detection imaging sensor system (1100), a processor (1200), and a messaging system (1300). The weapon fire detection imaging sensor system is comprised of three imaging detection sensors (1110, 1120, and 1130), each of which images in a different spectral range.

Figure 2B:
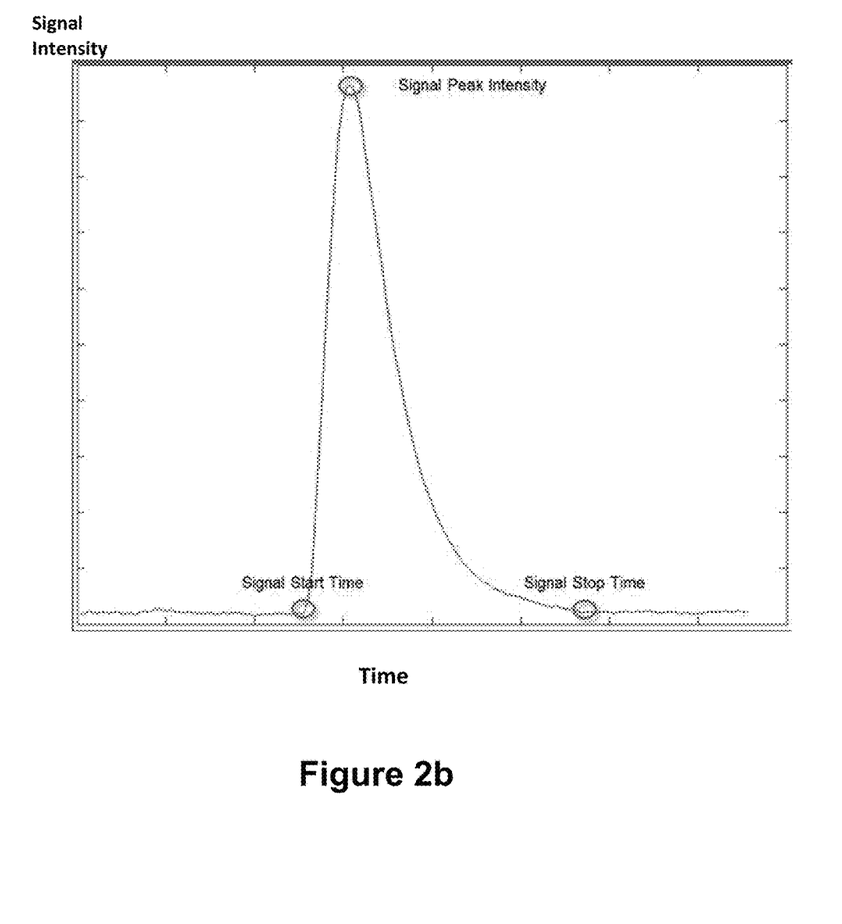
FIG. 2b illustrates an exemplary extracted weapon fire signature.

The three imaging detection sensors, contained in the weapons fire detection imaging sensor system, provide spectrally distinct signatures of weapon fire events. The extracted weapon fire signatures, as shown in FIG. 2b, provides intensity, duration, and shape information used for determining detections. Additionally, by analyzing the spectral signature in three bands from temporally and spatially synchronized weapon fire event signatures, a significant amount of clutter can be rejected. This clutter rejection is critical for on-the-move ground vehicle application against ground weapon fire targets that can occur at both near and far tactical ranges. The use of intensity, shape, and duration measurements from multiple temporally and spatially aligned spectral signatures improves upon prior art and allows for on-the-move application of weapon fire detection at relevant tactical ranges.

The first exemplary embodiment of the weapons fire detection imaging sensor system includes three imaging sensors. The three imaging sensors, one imaging in the long-wavelength infrared (LWIR) band, and the other two, imaging in the mid-wavelength infrared (MWIR) band, operate at a frame rate of 60 Hz and have a focal plane array (FPA) size of 640 by 480. The video output of the detection sensors is provided as input to the processor. The processor hosts the weapon fire detection and localization algorithm. The messaging system distributes the output results of the weapon fire detection and localization algorithm to other connected systems. One exemplary embodiment of the messaging system provides the output of the weapon fire detection processor to a weapon fire tracking system and a user alert system.

FIG. 2a describes the first exemplary weapon fire detection and localization algorithm. For each imaging detection sensor (1110, 1120, and 1130) contained in the weapon fire detection imaging sensor system (1100), the video output is provided to the processor (1200). Weapon fire detections are determined from the independent video output of each imaging detection sensor in the weapon fire detection sensor system (1210). See, U.S. patent application Ser. No. 15/234,184, by brown, J. B.; Hutchison III, J. E.; Davis, J. H.; Gabonia, J. K., entitled, "Weapon Fire Detection and Localization Algorithm for Electro-Optical Sensors," filed Aug. 11, 2016, due to publish on Feb. 15, 2018 as US Patent Application Publication (TBD), incorporated herein by reference. As an example, one first exemplary embodiment of the weapons fire detection imaging sensor system includes a LWIR sensor and two MWIR sensor. The output of the LWIR sensor is processed for potential detections. Independently, the output of each MWIR imaging sensor is processed to determine detections. Signal intensity, duration, and shape characteristics are used to determine detections. When using multiple imaging detection sensors, a single weapons fire event may generate detections on multiple sensors.

The detections across multiple sensors are then analyzed to determine whether the multiple detections across multiple sensors were generated by a single hostile fire event. Detection locations, detection event time, and characteristics of detected signatures are used to determine whether multiple detections were generated by the same weapons fire event. If the multiple detections are found to have been generated by a single hostile fire event, a single detection is created (1220). For example, in the previously mentioned example system, detections from each of the two MWIR sensor are analyzed against detections from the LWIR sensor to determine whether the detections were generated from the same weapons fire event. If the detections in the LWIR sensor and the detections in the two MWIR sensors were generated from the same weapons fire event, a single detection is generated to represent the associated detections, which contains signature information from both the LWIR detection and the two MWIR detections.

Features are calculated from the temporal and intensity profile of a detection and used to classify the detection as either weapons fire or false alarm, where weapon fire can be subdivided into ATGM, RR, and RPG (1230). Id. Associated detections, which have been classified as weapon fire are declared as weapon fire (1240). For each declared weapon fire event, the azimuth location, elevation location, weapon classification, and time of firing are reported.

The Second Exemplary Weapon Fire Detection and Localization System.

Figure 3:
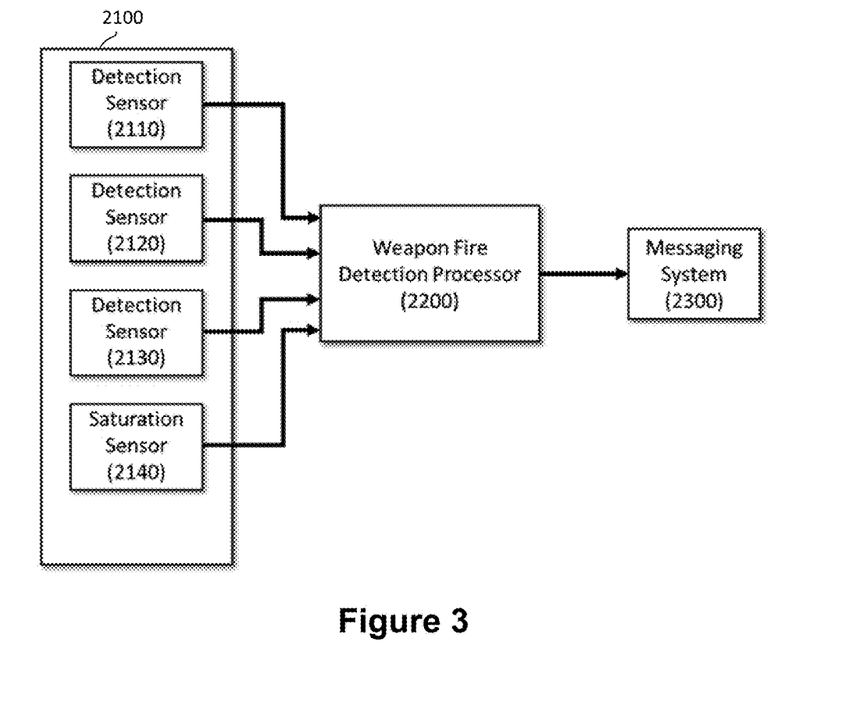
FIG. 3 describes a second exemplary weapon fire detection and localization system.

FIG. 3 describes the second exemplary weapon fire detection and localization system. The system is comprised of a weapon fire detection imaging sensor system (2100), a processor (2200), and a messaging system (2300). The weapon fire detection imaging sensor system is comprised of three imaging detection sensors (2110, 2120, 2130), each of which images in a different spectral range, and an imaging saturation sensor for detected saturated signals (2140). The video output of the detection sensors and the saturation sensor is provided as an input to the processor. The processor hosts the weapon fire detection and localization algorithm. The messaging system distributes the output results of the weapon fire detection and localization algorithm to other connected systems, providing an alert message.

Figure 4:
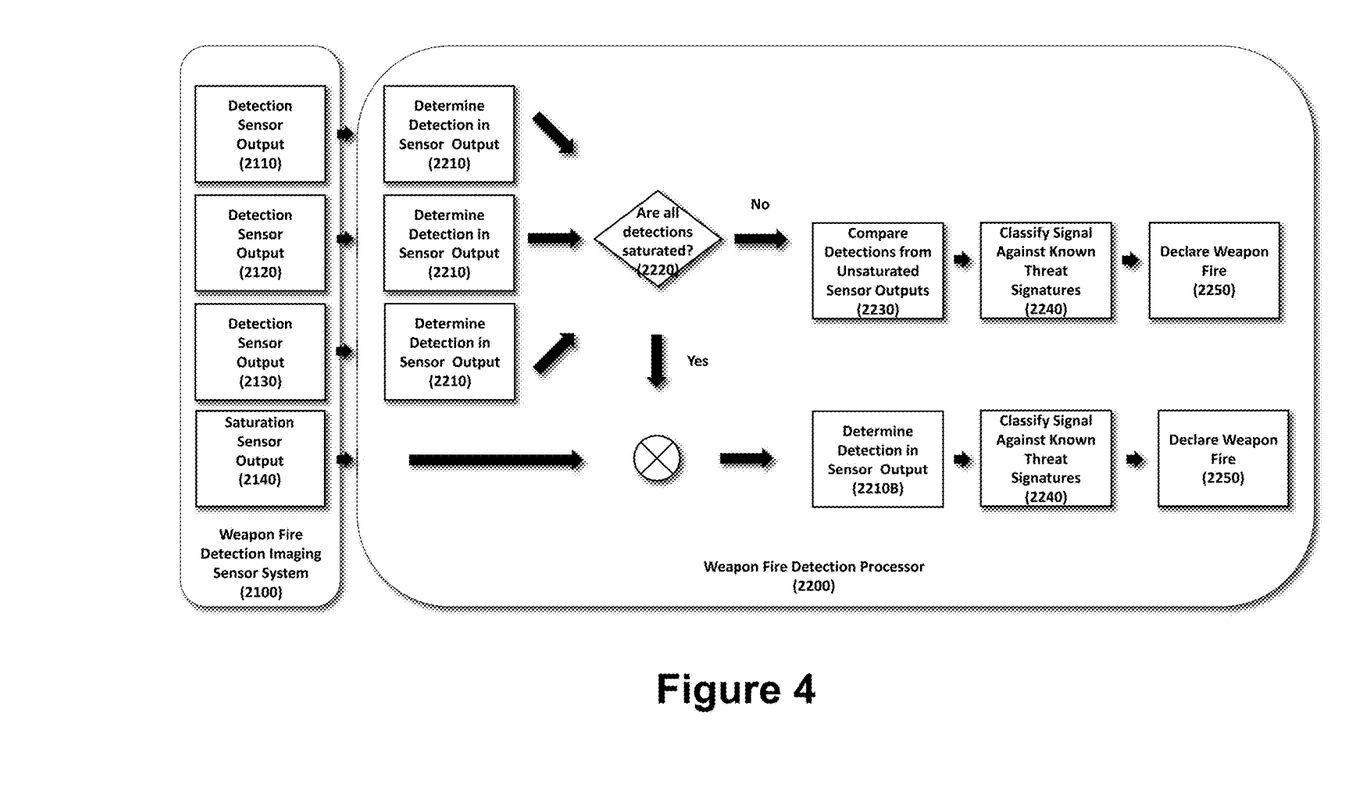
FIG. 4 describes a second exemplary weapon fire detection and localization algorithm as it relates to the second exemplary weapon fire detection and localization system.

FIG. 4 describes the second exemplary weapon fire detection and localization algorithm. For each imaging detection sensor (2110, 2120, and 2130) and the saturation sensor (2140), contained in the weapon fire detection imaging sensor system (2100), the video output is provided to the processor. Weapon fire detections are determined from the independent video output of each imaging detection sensor in the weapon fire detection sensor system (2210). The detections are analyzed to determine if saturation occurs in the detected signal of all three detection sensors (2220). When using multiple imaging detection sensors, a single weapons fire event may generate detections on multiple sensors. The detections across multiple sensors are then analyzed to determine if they were generated by a single hostile fire event. If the multiple detections are found to have been generated by a single hostile fire event and at least one detection sensor was not saturated, a single detection is created (2230). If, however, all three detection sensors are saturated, the output of the saturation sensor is processed to determine if a detection occurs (2210B) and if so, a single detection is created. Features are calculated from the temporal and intensity profiles of a detection and used to classify the detection as either weapons fire or false alarm, where weapon fire can be subdivided into ATGM, RR, and RPG (2240). Associated detections, which have been classified as weapon fire are declared as weapon fire (2250). For each declared weapon fire event, the azimuth location, elevation location, weapon classification, and time of firing are reported.

Detailed Description of Drawings (FIGS. 3 & 4)

FIG. 3 describes the second exemplary weapon fire detection and localization system. The system is comprised of a weapon fire detection imaging sensor system (2100), a processor (2200), and a messaging system (2300). The weapon fire detection imaging sensor system is comprised of three imaging detection sensors (2110, 2120, and 2130), each of which images in a different spectral range, and an imaging saturation sensor for detected saturated signals (2140). The saturation sensor is such that it does not saturate from anticipated weapons fire by limiting the energy reaching the sensor focal plane, reducing the sensitivity of the sensor, or a combination of both.

The three imaging detection sensors, contained in the weapons fire detection imaging sensor system, provide spectrally distinct signatures of weapon fire events. The extracted weapon fire signatures provides intensity, duration, and shape information used for determining detections. Additionally, by analyzing the spectral signature in three bands from temporally and spatially synchronized weapon fire event signatures, a significant amount of clutter can be rejected. This clutter rejection is critical for on-the-move ground vehicle application against ground weapon fire targets that can occur at both near and far tactical ranges. The imaging saturation sensor, contained in the weapons fire detection imaging sensor system allows for signal extraction, when the imaging detection sensors are saturated. This signal extraction provides for improved detection of close range threats that would otherwise saturate the detection sensors and also allows for removal of saturation clutter. The use of intensity, shape, and duration measurements from multiple temporally and spatially aligned spectral signatures improves upon prior art and allows for on-the-move application of weapon fire detection at relevant tactical ranges both near and far. Incorporation of the imaging saturation sensor reduces saturation clutter, and increases the effectiveness of weapons fire detection at close ranges.

The second exemplary embodiment of the weapons fire detection imaging sensor system includes four imaging sensors. The four imaging sensors, one imaging in the long-wavelength infrared (LWIR) band for detection, two imaging in the mid-wavelength infrared (MWIR) band for detection, and one imaging in the mid-wavelength infrared (MWIR) band for saturation, operate at a frame rate of 60 Hz and have a focal plane array (FPA) size of 640 by 480. The video output of the detection sensors is provided as input to the processor. The processor hosts the weapon fire detection and localization algorithm. The messaging system distributes the output results of the weapon fire detection and localization algorithm to other connected systems. One exemplary embodiment of the messaging system provides the output of the weapon fire detection processor to a weapon fire tracking system and a user alert system.

FIG. 4 describes the second exemplary weapon fire detection and localization algorithm. For each imaging detection sensor (2110, 2120, and 2130) and the imaging saturation sensor (2140) contained in the weapon fire detection imaging sensor system (2100), the video output is provided to the processor. Weapon fire detections are determined from the independent video output of each imaging detection sensor in the weapon fire detection sensor system (2210). See, U.S. patent application Ser. No. 15/234,184, by Brown, J. B.; Hutchison III, J. E.; Davis, J. H.; Gabonia, J. K., entitled, "Weapon Fire Detection and Localization Algorithm for Electro-Optical Sensors," filed Aug. 11, 2016, due to publish on Feb. 15, 2018 as US Patent Application Publication (TBD), incorporated herein by reference. The detections are analyzed to determine if saturation occurs in the detected signal of all three detection sensors (2220). If all three detection sensors are saturated, weapon fire detections are determined from the saturation sensor video output (2210B). Id. As an example, one second exemplary embodiment of the weapons fire detection imaging sensor system includes a LWIR detection sensor, two MWIR detection sensors, and one MWIR saturation sensor. The output of the LWIR detection sensor is processed for potential detections. Independently, the output of each MWIR detection sensors is processed to determine detections. Signal intensity, duration, and shape characteristics are used to determine detections. The detections are then processed to determine if saturation occurs in the detected signal of all three detection sensors. The output of the MWIR saturation sensor is processed for potential detections if all three detection sensors are saturated, returning a single detection for each weapon fire event. When using multiple imaging detection sensors, a single weapons fire event may generate detections on multiple sensors.

The detections across multiple detection sensors are then analyzed to determine whether the multiple detections across multiple sensors were generated by a single hostile fire event. Detection locations, detection event time, and characteristics of detected signatures are used to determine whether multiple detections were generated by the same weapons fire event. If the multiple detections are found to have been generated by a single hostile fire event, a single detection is created (2230). For example, in the previously mentioned example system, detections from each of the two MWIR detection sensors are analyzed against detections from the LWIR detection sensor to determine whether the detections were generated from the same weapons fire event. If the detections in the LWIR sensor and the detections in the two MWIR sensors were generated from the same weapons fire event, a single detection is generated to represent the associated detections, which contains signature information from both the LWIR detection and the two MWIR detections.

Features are calculated from the temporal and intensity profile of a detection and used to classify the detection as either weapons fire or false alarm, where weapon fire can be subdivided into ATGM, RR, and RPG (2240). Id. Associated detections, which have been classified as weapon fire are declared as weapon fire (2250). For each declared weapon fire event, the azimuth location, elevation location, weapon classification, and time of firing are reported.

The Third Exemplary Weapon Fire Detection and Localization System.

Figure 5:
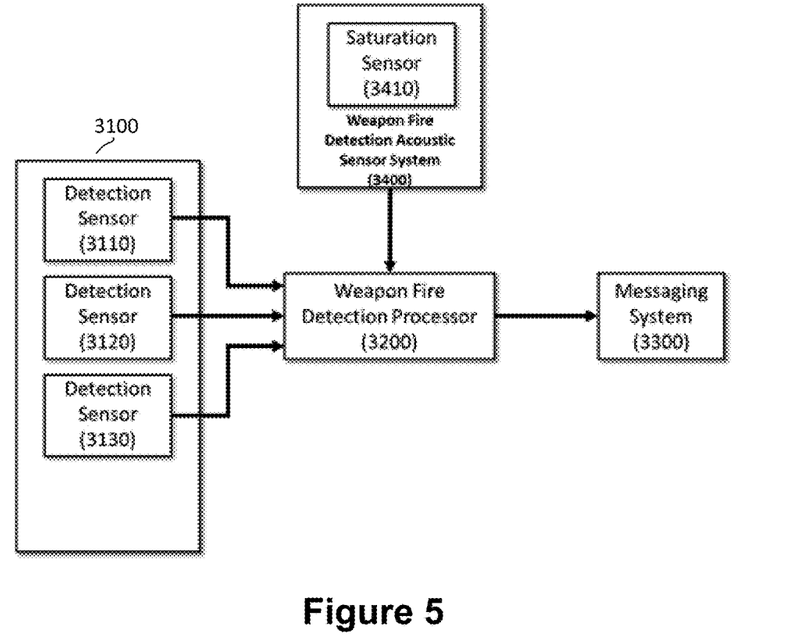
FIG. 5 describes a third exemplary weapon fire detection and localization system.

FIG. 5 describes the third exemplary weapon fire detection and localization system. The system is comprised of a weapon fire detection imaging sensor system (3100), a processor (3200), a messaging system (3300), and a weapon fire detection acoustic sensor system (3400). The weapon fire detection imaging sensor system is comprised of three imaging detection sensors (3110, 3120, 3130), each of which images in a different spectral range. The weapon fire detection acoustic sensor system contains an audio microphone saturation sensor and an analog to digital converter, for detected saturated signals (3410). The video output of the detection imaging sensors and the digital audio output of the saturation acoustic sensor are provided as inputs to the processor. The processor hosts the weapon fire detection and localization algorithm. The messaging system distributes the output results of the weapon fire detection and localization algorithm to other connected systems, providing an alert message.

Figure 6:
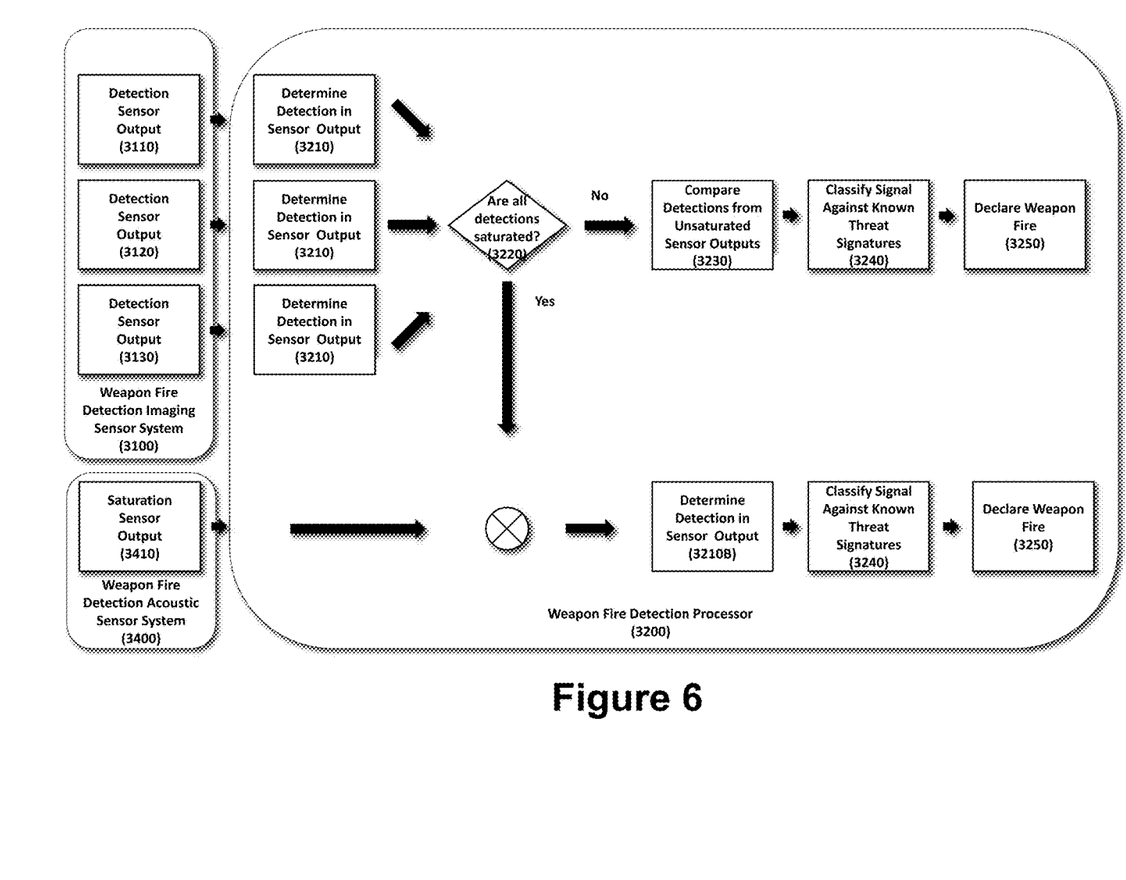
FIG. 6 describes a third exemplary weapon fire detection and localization algorithm as it relates to the third exemplary weapon fire detection and localization system.

FIG. 6 describes the third exemplary weapon fire detection and localization algorithm. For each imaging detection sensor (3110, 3120, and 3130) contained in the weapon fire detection imaging sensor system (3100), the video output is provided to the processor. The digital audio output of the saturation acoustic sensor (3410) contained in the weapon fire acoustic sensor system (3400) is also provided to the processor. Weapon fire detections are determined from the independent video output of each imaging detection sensor in the weapon fire detection sensor system (3210). The detections are analyzed to determine if saturation occurs in the detected signal of all three detection sensors (3220). When using multiple imaging detection sensors, a single weapons fire event may generate detections on multiple sensors. The detections across multiple sensors are then analyzed to determine if they were generated by a single hostile fire event. If the multiple detections are found to have been generated by a single hostile fire event and at least one detection sensor was not saturated, a single detection is created (3230). If, however, all three detection sensors are saturated, the output of the acoustic saturation sensor is processed to determine if a detection occurs (3210B), and if so, a single detection is created. Features are calculated from the temporal and intensity profiles of a detection and used to classify the detection as either weapons fire or false alarm, where weapon fire can be subdivided into ATGM, RR, and RPG (3240). Associated detections, which have been classified as weapon fire are declared as weapon fire (3250). For each declared weapon fire event, the azimuth location, elevation location, weapon classification, and time of firing are reported.

Detailed Description of Drawings (FIGS. 5 & 6)

FIG. 5 describes the third exemplary weapon fire detection and localization system. The system is comprised of a weapon fire detection imaging sensor system (3100), a processor (3200), and a messaging system (3300), and a weapon fire detection acoustic sensor system (3400). The weapon fire detection imaging sensor system is comprised of three imaging detection sensors (3110, 3120, and 3130), each of which images in a different spectral range. The weapon fire detection acoustic sensor system contains an audio microphone saturation sensor and an analog to digital converter, for detected saturated signals (3410).

The three imaging detection sensors, contained in the weapons fire detection imaging sensor system, provide spectrally distinct signatures of weapon fire events. The extracted weapon fire signatures provides intensity, duration, and shape information used for determining detections. Additionally, by analyzing the spectral signature in three bands from temporally and spatially synchronized weapon fire event signatures, a significant amount of clutter can be rejected. This clutter rejection is critical for on-the-move ground vehicle application against ground weapon fire targets that can occur at both near and far tactical ranges. The acoustic saturation sensor, contained in the weapons fire detection acoustic sensor system allows for signal extraction, when the imaging detection sensors are saturated. This signal extraction provides for improved detection of close range threats that would otherwise saturate the detection sensors and also allows for removal of saturation clutter. The use of intensity, shape, and duration measurements from multiple temporally and spatially aligned spectral signatures improves upon prior art and allows for on-the-move application of weapon fire detection at relevant tactical ranges both near and far. Incorporation of the acoustic saturation sensor reduces saturation clutter, and increases the effectiveness of weapons fire detection at close ranges.

The third exemplary embodiment of the weapons fire detection imaging sensor system includes three imaging sensors and an acoustic sensor. The three imaging sensors, one imaging in the long-wavelength infrared (LWIR) band for detection and two imaging in the mid-wavelength infrared (MWIR) band for detection, operate at a frame rate of 60 Hz and have a focal plane array (FPA) size of 640 by 480. The video output of the detection sensors is provided as input to the processor. The acoustic sensor, having a frequency response range of 20 Hz to 20 kHz, is sampled at 48 kHz with a 24-bit dynamic range, using an analog to digital converter. The digital audio output of the acoustic saturation sensor is provided as an input to the processor. The processor hosts the weapon fire detection and localization algorithm. The messaging system distributes the output results of the weapon fire detection and localization algorithm to other connected systems. One exemplary embodiment of the messaging system provides the output of the weapon fire detection processor to a weapon fire tracking system and a user alert system.

FIG. 6 describes the third exemplary weapon fire detection and localization algorithm. For each imaging detection sensor (3110, 3120, and 3130) contained in the weapon fire detection imaging sensor system (3100), the video output is provided to the processor. Weapon fire detections are determined from the independent video output of each imaging detection sensor in the weapon fire detection sensor system (3210). See, U.S. patent application Ser. No. 15/234,184, by Brown, J. B.; Hutchison III, J. E.; Davis, J. H.; Gabonia, J. K., entitled, "Weapon Fire Detection and Localization Algorithm for Electro-Optical Sensors," filed Aug. 11, 2016, due to publish on Feb. 15, 2018 as US Patent Application Publication (TBD), incorporated herein by reference. The detections are analyzed to determine if saturation occurs in the detected signal of all three detection sensors (3220). If all three detection sensors are saturated, weapon fire detections are determined from the saturation sensor audio output (3210B).

As an example, one third exemplary embodiment of the weapons fire detection imaging sensor system includes a LWIR detection sensor, two MWIR detection sensors. The output of the LWIR detection sensor is processed for potential detections. Independently, the output of each MWIR detection sensors is processed to determine detections. Signal intensity, duration, and shape characteristics are used to determine detections. The detections are then processed to determine if saturation occurs in the detected signal of all three detection sensors. In the same example, one exemplary embodiment of the weapon fire detection acoustic sensor system includes a microphone, having a frequency response range of 20 Hz to 20 kHz, which is sampled at 48 kHz with a 24-bit dynamic range, using an analog to digital converter. Detections are determined by signal intensity, duration, shape, and event time. The digital output of the acoustic saturation sensor is processed for potential detections if all three detection sensors are saturated, returning a single detection for each weapon fire event.

When using multiple imaging detection sensors, a single weapons fire event may generate detections on multiple sensors. The detections across multiple detection sensors are then analyzed to determine whether the multiple detections across multiple sensors were generated by a single hostile fire event. Detection locations, detection event time, and characteristics of detected signatures are used to determine whether multiple detections were generated by the same weapons fire event. If the multiple detections are found to have been generated by a single hostile fire event, a single detection is created (3230). For example, in the previously mentioned example system, detections from each of the two MWIR detection sensors are analyzed against detections from the LWIR detection sensor to determine whether the detections were generated from the same weapons fire event. If the detections in the LWIR sensor and the detections in the two MWIR sensors were generated from the same weapons fire event, a single detection is generated to represent the associated detections, which contains signature information from both the LWIR detection and the two MWIR detections.

Features are calculated from the temporal and intensity profile of a detection and used to classify the detection as either weapons fire or false alarm, where weapon fire can be subdivided into ATGM, RR, and RPG (3240). Id. Associated detections, which have been classified as weapon fire are declared as weapon fire (3250). For each declared weapon fire event, the azimuth location, elevation location, weapon classification, and time of firing are reported.

The Fourth Exemplary Weapon Fire Detection and Localization System.

Figure 7:
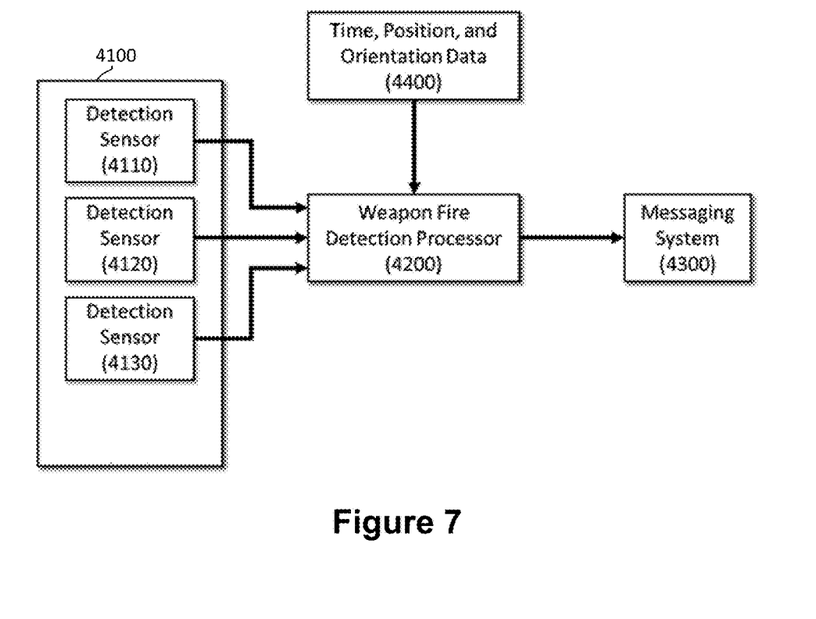
FIG. 7 describes a fourth exemplary weapon fire detection and localization system.

FIG. 7 describes the fourth exemplary weapon fire detection and localization system. The system is comprised of a weapon fire detection imaging sensor system (4100), a processor (4200), a messaging system (4300), and a data input containing time, position, and orientation (4400). The weapon fire detection imaging sensor system is comprised of three imaging detection sensors (4110, 4120, 4130), each of which images in a different spectral range. The video output of the detection sensors and the data containing time, position, and orientation, are provided as an input to the processor. The processor hosts the weapon fire detection and localization algorithm. The messaging system distributes the output results of the weapon fire detection and localization algorithm to other connected systems, providing an alert message.

Figure 8:
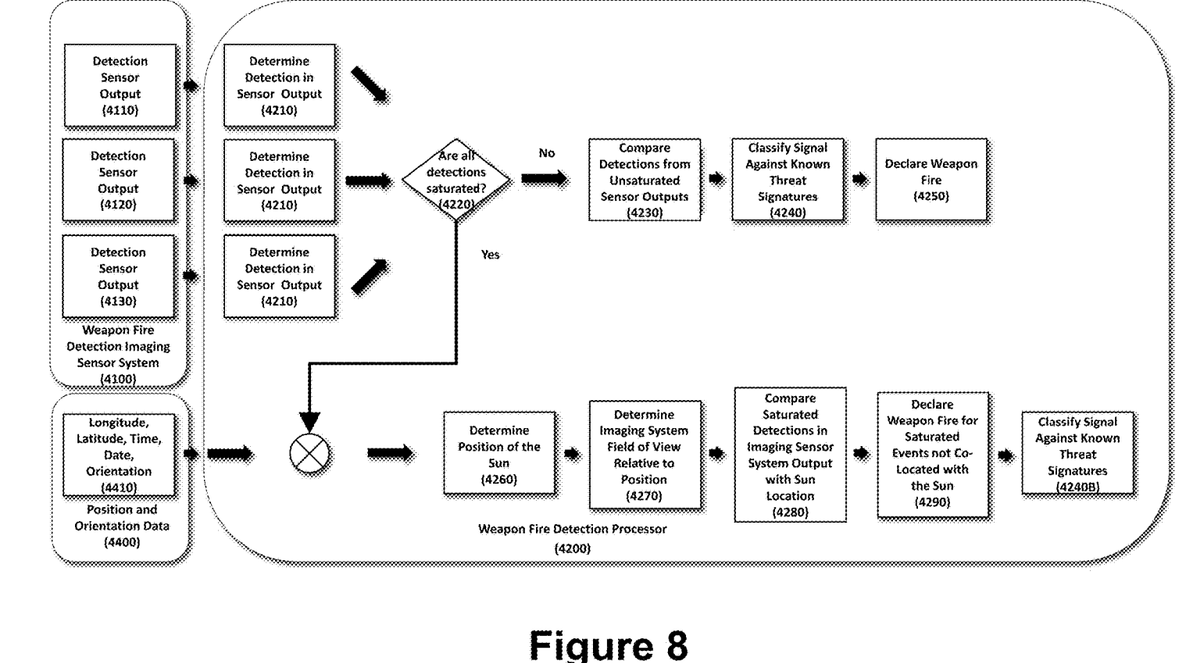
FIG. 8 describes a fourth weapon fire detection and localization algorithm as it relates to the fourth exemplary weapon fire detection and localization system.

FIG. 8 describes the fourth exemplary weapon fire detection and localization algorithm. For each imaging detection sensor (4110, 4120, and 4130) contained in the weapon fire detection imaging sensor system (4100), the video output is provided to the processor. Weapon fire detections are determined from the independent video output of each imaging detection sensor in the weapon fire detection sensor system (4210). The detections are analyzed to determine if saturation occurs in the detected signal of all three detection sensors (4220). When using multiple imaging detection sensors, a single weapons fire event may generate detections on multiple sensors. The detections across multiple sensors are then analyzed to determine if they were generated by a single hostile fire event. If the multiple detections are found to have been generated by a single hostile fire event and at least one detection sensor was not saturated, a single detection is created (4230). If, however, all three detection sensors are saturated, the data containing position and time is processed to determine the position of the sun (4260). The orientation data is then used to determine the detection imaging sensor system's field of view, relative to the detection imaging system's position (4270). Locations of detected saturated signals are compared with the calculated position of the sun (4280). Saturated events not co-located with the sun are declared as weapon fire (4290). Saturated events declared as weapon fire are classified against known threat signatures (4240B).

When all three detection sensors are not saturated and a single detection is created, features are calculated from the temporal and intensity profiles of the detection and used to classify the detection as either weapons fire or false alarm, where weapon fire can be subdivided into ATGM, RR, and RPG (4240). Associated detections, which have been classified as weapon fire are declared as weapon fire (4250). For each declared weapon fire event, the azimuth location, elevation location, weapon classification, and time of firing are reported.

Detailed Description of Drawings (FIGS. 7 & 8)

FIG. 7 describes the fourth exemplary weapon fire detection and localization system. The system is comprised of a weapon fire detection imaging sensor system (4100), a processor (4200), a messaging system (4300), and a data input containing time, position, and orientation (4400). The weapon fire detection imaging sensor system is comprised of three imaging detection sensors (4110, 4120, and 4130), each of which images in a different spectral range.

The three imaging detection sensors, contained in the weapons fire detection imaging sensor system, provide spectrally distinct signatures of weapon fire events. The extracted weapon fire signatures provides intensity, duration, and shape information used for determining detections. Additionally, by analyzing the spectral signature in three bands from temporally and spatially synchronized weapon fire event signatures, a significant amount of clutter can be rejected. This clutter rejection is critical for on-the-move ground vehicle application against ground weapon fire targets that can occur at both near and far tactical ranges. The longitude, latitude, orientation, date, and time data is used to determine the position of the sun, relative to the detections sensors' field of view, when the imaging detection sensors are saturated. This determination allows for increased saturation clutter rejection due to the known position of the sun and provides for improved detection of close range weapon fire events. The use of intensity, shape, and duration measurements from multiple temporally and spatially aligned spectral signatures improves upon prior art and allows for on-the-move application of weapon fire detection at relevant tactical ranges both near and far. Incorporation of sun detection reduces saturation clutter, and increases the effectiveness of weapons fire detection at close ranges.

The fourth exemplary embodiment of the weapons fire detection imaging sensor system includes three imaging sensors. The three imaging sensors, one imaging in the long-wavelength infrared (LWIR) band for detection, and two imaging in the mid-wavelength infrared (MWIR) band for detection, operate at a frame rate of 60 Hz and have a focal plane array (FPA) size of 640 by 480. In the same example, the longitude and latitude position, the global date and time, and the detection imaging system's three axis orientation are available. The video output of the detection sensors and the data containing time, position, and orientation is provided as input to the processor. The processor hosts the weapon fire detection and localization algorithm. The messaging system distributes the output results of the weapon fire detection and localization algorithm to other connected systems. One exemplary embodiment of the messaging system provides the output of the weapon fire detection processor to a weapon fire tracking system and a user alert system.

FIG. 8 describes the fourth exemplary weapon fire detection and localization algorithm. For each imaging detection sensor (4110, 4120, and 4130) contained in the weapon fire detection imaging sensor system (4100), the video output is provided to the processor. Weapon fire detections are determined from the independent video output of each imaging detection sensor in the weapon fire detection sensor system (4210). See, U.S. patent application Ser. No. 15/234,184, by Brown, J. B.; Hutchison III, J. E.; Davis, J. H.; Gabonia, J. K., entitled, "Weapon Fire Detection and Localization Algorithm for Electro-Optical Sensors," filed Aug. 11, 2016, due to publish on Feb. 15, 2018 as US Patent Application Publication (TBD), incorporated herein by reference. The detections are analyzed to determine if saturation occurs in the detected signal of all three detection sensors (4220). As an example, one fourth exemplary embodiment of the weapons fire detection imaging sensor system includes a LWIR detection sensor, and two MWIR detection sensors. The output of the LWIR detection sensor is processed for potential detections. Independently, the output of each MWIR detection sensors is processed to determine detections. Signal intensity, duration, and shape characteristics are used to determine detections. The detections are then processed to determine if saturation occurs in the detected signal of all three detection sensors.

Continuing the same example, in the fourth exemplary embodiment, longitude position, latitude position, global date and time are provided by a global positioning system and the detection imaging system's three axis orientation is provided by an accelerometer (4410). The global positioning system and accelerometer module (4410) is co-located with the weapon fire detection imaging sensor system. If all three detection sensors are saturated, position and orientation data is accessed. The data containing position and time is processed to determine the position of the sun (4260). The orientation data is then used to determine the detection imaging sensor system's field of view, relative to the detection imaging system's position (4270). Locations of detected saturated signals are compared with the calculated position of the sun (4280). Saturated events not co-located with the sun within the field of view of the detection imaging system, are declared as weapon fire (4290). Saturated events declared as weapon fire are classified against known threat signatures using characteristics of signal duration and shape (4240B).

When using multiple imaging detection sensors, a single weapons fire event may generate detections on multiple sensors. The detections across multiple detection sensors are then analyzed to determine whether the multiple detections across multiple sensors were generated by a single hostile fire event. Detection locations, detection event time, and characteristics of detected signatures are used to determine whether multiple detections were generated by the same weapons fire event. If the multiple detections are found to have been generated by a single hostile fire event, a single detection is created (4230). For example, in the previously mentioned example system, detections from each of the two MWIR detection sensors are analyzed against detections from the LWIR detection sensor to determine whether the detections were generated from the same weapons fire event. If the detections in the LWIR sensor and the detections in the two MWIR sensors were generated from the same weapons fire event, a single detection is generated to represent the associated detections, which contains signature information from both the LWIR detection and the two MWIR detections.

Features are calculated from the temporal and intensity profile of a detection and used to classify the detection as either weapons fire or false alarm, where weapon fire can be subdivided into ATGM, RR, and RPG (4240). Id. Associated detections, which have been classified as weapon fire are declared as weapon fire (4250). For each declared weapon fire event, the azimuth location, elevation location, weapon classification, and time of firing are reported.

It is obvious that many modifications and variations of the present invention are possible in light of the above teachings. It is therefore to be understood that within the scope of the appended claims, the invention may be practiced otherwise than as described.

What is claimed is:

1. A weapon fire detection and localization system, comprising:

a weapon fire detection imaging sensor system based on three imaging detection sensors, each of which is based on a respective focal plane array which images in a different spectral range to, produce a video output to provide spectrally distinct signatures of weapon fire events;

a global positioning system and accelerometer module based on a global positioning system capable of providing longitude position, latitude position, global date and time, and an accelerometer capable of determining a three axis orientation;

a processor to computer process said video outputs using a weapon fire detection and localization algorithm to compute intensity, shape, and duration measurements from multiple temporally and spatially aligned spectral signatures and derive weapon fire detection and localization results, said weapon fire detection and localization algorithm comprising the following steps:

video outputs from said three imaging detection sensors are provided to the processor as sensor outputs;

a data input containing time, position, and orientation of said global positioning system and accelerometer module is provided to the processor;

weapon fire detections are independently determined from the video output of each imaging detection sensor in the weapon fire detection sensor system, wherein signal intensity, duration, and shape characteristics are used to determine detections;

said weapon fire detections are analyzed to determine if saturation occurs in the detected signal of all three detection sensors, wherein if all three imaging detection sensors are determined to be saturated, then the following steps are taken: the data input containing time, position, and orientation is processed to calculate a position of the sun, orientation data is used to determine a field of view of the detection imaging sensor system, relative to a position of the detection imaging sensor system, locations of detected saturated signals are compared with the calculated position of the sun, saturated events not co-located with the sun are declared as weapon fire, and saturated events declared as weapon fire are classified against known threat signatures as a resulting detection;

if multiple detections are found to be associated, have been generated by a single hostile fire event, and at least one detection sensor was not saturated, a single detection is created as a resulting detection;

for the resulting detection, features are calculated from temporal and intensity profiles of detection and used to classify the created detection as either weapons fire or false alarm, where weapon fire can be subdivided into ATGM, RR, and RPG; and associated detections, or the resulting detection, which have been classified as a weapon fire is declared as a weapon fire, wherein for each declared weapon fire event, azimuth location, elevation location, weapon classification, and time of firing are reported; and a messaging system to provide an alert message based on the weapon fire detection and localization results.

2. The weapon fire detection and localization system recited in claim 1, wherein the messaging system distributes the results of the weapon fire detection and localization algorithm to other connected systems, such as a weapon fire tracking system and a user alert system, providing an alert message.

3. The weapon fire detection and localization system recited in claim 1, wherein the weapon fire detection imaging sensor system is based on one LWIR sensor which images in the long-wavelength infrared band, and two MWIR sensors which image in the mid-wavelength infrared band, wherein the output of the LWIR sensor is processed for potential detections, whereas the output of each MWIR imaging sensor is processed to determine detections.

4. The weapon fire detection and localization system recited in claim 3, wherein detections from each of the two MWIR sensor are analyzed against detections from the LWIR sensor to determine whether the detections were generated from the same weapons fire event, wherein if the detection in the LWIR sensor and the detections in the two MWIR sensors are associated as generated from the same weapon fire event, a single detection is generated to represent associated detections, which single detection contains signature information from both the LWIR detection and the two MWIR detections.

5. The weapon fire detection and localization system recited in claim 1, wherein said weapon fire detection and localization algorithm is comprised of the following steps:
video outputs from said three imaging detection sensors are provided to the processor as sensor outputs;
weapon fire detections are determined independently from the video output of each imaging detection sensor in the weapon fire detection sensor system, wherein signal intensity, duration, and shape characteristics are used to determine detections;
detections from multiple sensor outputs are compared, and if multiple detections are associated and found to have been generated by a single hostile fire event, then a single detection is created;
features are calculated frons a temporal and intensity profile of a detection and used to classify the detection as either weapons fire or false alarm, where weapon fire can be subdivided into ATGM, RR, and RPG; and
associated detections Which have been classified as weapon fire are declared as a weapon fire, wherein for each declared weapon tine event, azimuth location, elevation location, weapon classification, and time of firing are reported.

6. The weapon fire detection and localization system recited, in claim 5, wherein detection locations, detection event time, and characteristics of detected signatures are used to determine whether multiple detections are associated and generated by the same weapons fire event.

7. A weapon fire detection and localization system utilizing a saturation sensor, comprising:
a weapon fire detection imaging sensor system comprising one imaging detection sensor which images in the long-wavelength infrared band, two imaging detection sensors which image in the mid-wavelength infrared band, and an imaging saturation sensor which images to a sensor focal plane in the mid-wavelength infrared band for detected saturated signals, said imaging saturation sensor being capable of preventing saturation from an anticipated weapons fire, each providing a video output as input to the processor;
a weapon fire detection processor to computer process said video outputs using a weapon fire detection and localization algorithm to compute intensity, shape, and duration measurements from multiple temporally and spatially aligned spectral signatures and output weapon fire detection and localization results; and
a messaging system to provide an alert message based on the weapon fire detection and localization results.

8. The weapon fire detection and localization system utilizing a saturation sensor as recited in claim 7, wherein the messaging system provides the output of the weapon fire detection processor to a weapon fire tracking system and a user alert system, providing an alert message.

9. The weapon fire detection and localization system utilizing a saturation sensor as recited in claim 7, wherein said imaging saturation sensor prevents saturation from anticipated weapons fire by at least one of limiting energy reaching its sensor focal plane and reducing sensitivity of the imaging saturation sensor.

10. The weapon fire detection and localization system utilizing a saturation sensor as recited in claim 7, wherein detections across multiple detection sensors are analyzed to determine whether the multiple detections across multiple sensors were generated by a single hostile fire event based on detection locations, detection event time, and characteristics of detected signatures.

11. The weapon fire detection and localization system utilizing a saturation sensor as recited in claim 7, Wherein said weapon fire detection and localization algorithm is comprised of the following steps:
video outputs from each imaging detection sensor and a saturation sensor video output of the imaging saturation sensor are provided to the processor as sensor outputs;
weapon fire detections are determined independently from the video output of each imaging detection sensor in the weapon fire detection sensor system, wherein signal intensity, duration, and shape characteristics are used to determine detections;
said weapon fire detections are analyzed to determine if saturation occurs in the detected signal of all three detection sensors;
if all three imaging detection sensors are saturated, a weapon fire detection is determined from the saturation sensor video output, wherein if a detection occurs, a single detection is created as a resulting detection;
if multiple imaging detection sensor detections are found to be associated and generated by a single hostile fire event, a single detection is created as a resulting detection,
features are calculated from the temporal and intensity profile of the resulting detection and used to classify the detection as either weapons fire or false alarm, where weapon fire can be subdivided into ATOM, RR, and RPG; and
associated detections, or the resulting detection, which have been classified as a weapon fire is declared as a weapon fire, wherein for each declared weapon fire event, the azimuth location, elevation location, weapon classification, and time of firing are reported.

12. The weapon fire detection and localization system utilizing a saturation sensor as recited in claim 7, wherein the one imaging detection sensor which images in the long-wavelength infrared band is an LWIR detection sensor, and the two imaging detection sensors which image in the mid-wavelength infrared band are MWIR detection sensors.

13. The weapon fire detection and localization system utilizing a saturation sensor as recited in claim 12, wherein the output of the LWIR detection sensor is processed for potential detections, the output of each MWIR detection sensors is processed to determine detections, and the output of the image saturation sensor is processed for potential detections if all three imaging detection sensors are saturated, returning a single detection as a resulting detection for each weapon fire event.

14. The weapon fire detection and localization system utilizing a saturation sensor as recited in claim 12, wherein detections from each of the two MWIR detection sensors are analyzed against detections from the LW IR detection sensor to determine whether the detections were generated from the same weapons fire event, wherein if the detections in the LWIR sensor and the detections in the two MWIR sensors are associated, and were generated from the same weapons fire event, a single detection is generated as a resulting detection to represent the associated detections, which resulting detection contains signature information from both the LWIR detection and the two MWIR detections.

15. A weapon fire detection and localization system utilizing an acoustic sensor, comprising:
   a weapon fire detection imaging sensor system based on three imaging detection sensors, each of which images in a different spectral range to produce a video output to provide spectrally distinct signatures of weapon fire events;
   a weapon fire detection acoustic sensor system based on an audio microphone saturation sensor and an analog to digital converter to detect saturated signals;
   a processor to computer process said video outputs of the imaging detection sensors and a digital audio output of the audio microphone saturation sensor using a weapon fire detection and localization algorithm to compute intensity, shape, and duration measurements from multiple temporally and spatially aligned spectral signatures and derive weapon fire detection and localization results, wherein video outputs from each imaging detection sensor in the weapon fire detection imaging sensor system are provided to the processor as image sensor outputs, and the digital audio output of the audio microphone saturation sensor in the weapon fire acoustic sensor system is provided to the processor as a saturation acoustic sensor output, and wherein said weapon fire detection and localization algorithm is comprised of the following steps:
   weapon fire detections are independently determined from the video output of each imaging detection sensor in the weapon fire detection sensor system,
   the weapon fire detections are analyzed to determine if saturation occurs in the detected signal of all three imaging detection sensors,
   if all three imaging detection sensors are saturated, the saturation acoustic sensor output is processed to determine if a detection occurred, and if so, a single detection is created as a resulting detection,
   if multiple detections are found to be associated and generated by a single hostile fire event and at least one imaging detection sensor was not saturated, a single detection is created as a resulting detection,
   features are calculated from the temporal and intensity profiles of the resulting detection and used to classify the detection as either weapons fire or false alarm, where weapon fire can be subdivided into ATGM, RR, and RPG, and
   associated detections, or the resulting detection, which has been classified as a weapon fire is declared as a weapon fire, wherein for each declared weapon fire event, the azimuth location, elevation location, weapon classification, and time of firing are reported; and
   a messaging system to distribute the output results of the weapon fire detection and localization algorithm to other connected systems and provide an alert message.

16. The weapon fire detection and localization system utilizing an acoustic sensor as recited in claim 15, wherein the weapon fire detection imaging sensor system is based on one LWIR sensor which images in the long wavelength infrared band and two MWIR sensors which image in the mid-wavelength infrared band our imaging sensors, wherein if the detection in the LWIR sensor and the detections in the two MWIR sensors were found to be associated and generated from the same weapons fire event, a single resulting detection is generated to represent the associated detections, which resulting detection contains signature information from both the LWIR detection and the two MWIR detections.

* * * * *